2,803,643
PURIFICATION OF DINITRILES

Ronald H. Halliwell, Victoria, Tex., assignor to E. I. du Pont de Nemours and Company, Wilmington, Del., a corporation of Delaware No Drawing. Application July 21, 1954,
Serial No. 444,907

5 Claims. (Cl. 260—465.8)

This invention relates to the purification of aliphatic organic polynitriles and more particularly to the preparation of adiponitrile having a high degree of purity.

One of the more important uses of adiponitrile, at the present time, is in the preparation of hexamethylene diamine. This amine is used as a detergent, insecticide, emulsifying agent, and as an intermediate in the preparation of polymeric derivatives. Usually a catalytic hydrogenation reaction is employed to convert the adiponitrile to hexamethylene diamine, a reaction which is quite sensitive to the presence of the contaminants normally present in the adiponitrile. Moreover, one of the important uses for adiponitrile is as an intermediate in the preparation of synthetic linear polyamides which are used extensively in the textile industry for the preparation of filaments. It has been established that impurities present in the polyamides are, in many instances, derived from those initially present in the adiponitrile. These impurities cause viscosity variations during spinning which result in nonuniform products.

There are several methods employed for synthesizing adiponitrile, such as the process of U. S. Patent 2,144,340 in which adipic acid is catalytically hydrogenated in the presence of ammonia, U. S. 2,532,311 in which dicyanobutene is similarly hydrogenated under similar conditions, and others. In these processes, active hydrogenation catalysts are employed and the reaction conducted under elevated temperatures and pressures. It has been found that in these as well as in other processes for producing adiponitrile, the involved nature of the reactions results in contaminated products. Some of the impurities present in adiponitrile, prepared by the aforesaid processes, that have been identified are: hydrogen cyanide, adipamic acid, delta-cyanovaleric acid, delta-cyanovaleramide, 2-cyanocyclopentylideneimine, 2 - cyanocyclopentanone; cyclopentanone, dicyclopentylidine, tricyclotrimethylene benzene, 1,1-tetramethylenecyclohexanone, 2,3-cyclopentenocycloheptanone, pyrrole, ethyl succinonitrile, valeronitrile, cis and trans 1,4-dicyanoethylcyclohexane, cis and trans 1,4-dicyanobutene-1 and other unidentified compounds containing imino groups, amine type compounds, and the like. The invention is directed to a process of reducing the concentration of the least desirable of the above contaminants below the most exacting minimum standards.

An object of the present invention is to provide a process for purifying adiponitrile containing the aforesaid impurities that are derived from processes such as have been described, or adiponitrile containing such impurities obtained by any process. A further object of the invention is to provide a process in which the adiponitrile in the reaction mixture in which it is formed, or in any solution in which it is present with impurities, is treated with a hydrazine, and the adiponitrile recovered therefrom by fractional distillation or by another suitable process. Other objects and advantages of the invention will hereinafter appear.

In accord with the invention, it has been discovered that aliphatic organic dinitriles, and particularly adiponitrile, of excellent quality and suitable for use as intermediates in processes requiring a high degree of purity in the nitrile used, can be recovered from a reaction mixture, in which the nitrile is present with undesirable quantities of contaminants, by treating the mixture, at an elevated temperature, with a hydrazine having the formula

in which R and $R_1$ are hydrogen or hydrocarbon groups, the groups being similar or dissimilar. It is economical to carry out this treatment in the reaction mixture from the synthesis of adiponitrile during the transfer of that mixture to a distillation column or other device used for separating the adiponitrile from the byproducts, impurities and other contaminants present. During subsequent distillation, the hydrazine reaction products of the impurities in the adiponitrile are separated from the adiponitrile and an exceptionally pure adiponitrile is recovered.

One of the contaminants present in adiponitrile obtained from the catalytic hydrogenation of dicyanobutene is 2-cyanocycloptenylideneimine. This contaminant, although it boils below adiponitrile, is separated from the nitrile only with difficulty. To meet acceptable standards for 2-cyanocyclopentylideneimine, excessive foreshots purges during rectification have been necessary with resultant excessive yield losses. By purification in accord with the invention, this and like contaminants are converted to corresponding hydrazones and/or other compounds easily separated by simple distillation to give an adiponitrile with a 2-cyanocyclopentylideneimine of less than 100 m. p. m. (mols per million mols of the nitrile).

The examples which follow described embodiments of the invention in which parts are by weight unless otherwise stated:

Example I 100 parts by weight of adiponitrile prepared by hydrogenating dicyanobutene, in accord with the process of U. S. 2,532,311, and which contained 2370 m. p. m. of 2-cyanocyclopentylideneimine was treated with 0.044 part by weight of hydrazine added as a solution of hydrazine hydrate in water. After heating to 180° C. for 15 mins. the resultant mixture contained 1300 m. p. m. of 2-cyanocyclopentylideneimine.

Example II 100 parts by weight of adiponitrile prepared by hydrogenating dicyanobutene and containing 2150 m. p. m. of 2-cyanocyclopentylideneimine, as referred to in Example I, was treated with 0.05% of hydrazine added as a solution of hydrazine hydrate in water, and the mixture heated to 190° C. for 15 mins. This reaction mixture was fed to a refining train consisting of a topping column and a refining column. The resultant product was a highly refined adiponitrile containing 150 m. p. m. of 2-cyanocyclopentylideneimine and having a color of 5, by a standard color test. The same adiponitrile not treated with hydrazine when fed to the same refining train yielded a product containing 1300 m. p. m. 2-cyanocyclopentylideneimine and having a color of 15, by the same test.

Example III 100 parts by weight of adiponitrile prepared by hydrogenation of dicyanobutene and containing 1300 m. p. m. of 2-cyanocyclopentylideneimine was treated with 0.025 part of hydrazine added as a solution of hydrazine hydrate in water. The mixture was heated to 200° C. for 10 mins. and the reaction product was fed to a refining train consisting of a topping column and a refining column. The low boiling purge from the topping column was maintained at a value such that the resulting adiponitrile produced from the refiner contained 100 m. p. m. of 2-cyanocyclopentylideneimine. This necessitated a foreshots make of 6% of the train feed. The same experiment was repeated without the use of hydrazine. The foreshots purge necessary to produce adiponitrile containing 100 m. p. m. of 2-cyanocyclopentylideneimine was 23% of the train feed.

The purification effected by the process of the invention is applicable generally to the treatment of similarly contaminated aliphatic organic polynitriles. Hydrazines under the conditions of purification described are selective in their action on contaminants with respect to aliphatic organic polynitriles generally and can be removed with facility from the treated reaction mixture.

The hydrazines that are used to effect the purification include hydrazine, $N_2H_4$, and its hydrates and hydrochlorides, as well as the mono- and di-methyl, ethyl and higher alkyl substituted hydrazines, also the aryl substituted hydrazines such as, for example, phenyl hydrazine, and also carbonyl hydrazine.

Since the principal reaction that takes place when a hydrazine is heated in a crude reaction mixture containing adiponitrile is that of forming hydrazones with such compounds as 2-cyanocyclopentylideneimine, the amount of the hydrazine added to assist in the separation should be gauged accordingly. If the degree of contamination is known, a stoichiometric amount of the hydrazine will usually be adequate to remove the contaminants with the addition of 5 to 10% by weight in excess, and the resulting mixture heated to a temperature between 100 to 250° C. and preferably between 160° C. and 190° C. for a period of time sufficient, usually between 5 and 30 minutes, to allow the reaction to take place.

While the simplest method of removing the hydrazine reaction products is by distillation or fractionation, other methods may be used, such as for example, by extraction with a solvent for the product that is a non-solvent for the adiponitrile, or any other established method for the separation of organic compounds having dissimilar vapor pressures and/or solubility characteristics.

It is understood that the foregoing examples are illustrative of preferred embodiments of the invention, and that numerous other embodiments will come within the scope of this invention as is well known to those skilled in this art.

I claim:

1. In a process for the purification of an aliphatic organic dinitrile, contaminated with by-products formed during its synthesis, the steps which comprise heating the contaminated aliphatic organic dinitrile with a hydrazine having the formula,

in which R and $R_1$ are selected from the group consisting of hydrogen and hydrocarbon groups, and thereafter separating the resultant purified dinitrile from the reaction mixture.

2. In a process for the purification and separation of adiponitrile from a reaction mixture obtained by the catalytic hydrogenation of dicyanobutene, the steps which comprise heating the reaction mixture from the dicyanobutene hydrogenation reaction with a hydrazine having the formula,

in which R and $R_1$ are selected from the group consisting of hydrogen and hydrocarbon groups, and thereafter separating the adiponitrile from the hydrazine reaction mixture by fractionation.

3. The process of claim 2 in which there is present from 5 to 10% by weight of the hydrazine in excess of stoichiometric amounts.

4. The process of claim 3 conducted at a temperature between 100 and 250° C.

5. In a process for the purification and separation of adiponitrile from a reaction mixture obtained by the catalytic hydrogenation of dicyanobutene, the steps which comprise heating the reaction mixture from the dicyanobutene hydrogenation reaction with a hydrazine of the group consisting of hydrazine hydrates and hydrazine hydrochlorides, and thereafter separating the purified adiponitrile from the reaction mixture.

References Cited in the file of this patent
UNITED STATES PATENTS

| | | |
|---|---|---|
| 625,108 | Hewitt | May 16, 1899 |
| 1,892,972 | Urbain | Jan. 3, 1933 |
| 2,635,074 | Steitz | Apr. 14, 1953 |